US012764763B2

(12) United States Patent
El Ferkouss et al.

(10) Patent No.: US 12,764,763 B2
(45) Date of Patent: Oct. 13, 2026

(54) AFC OPTIMIZATION FOR WLAN DEPLOYMENTS

(71) Applicant: HEWLETT PACKARD ENTERPRISE DEVELOPMENT LP, Spring, TX (US)

(72) Inventors: Omar El Ferkouss, St. Laurent (CA); Nethra Muniyappa, Santa Clara, CA (US); Andre Beaudin, St. Laurent (CA)

(73) Assignee: Hewlett Packard Enterprise Development LP, Spring, TX (US)

(*) Notice: Subject to any disclaimer, the term of this patent is extended or adjusted under 35 U.S.C. 154(b) by 290 days.

(21) Appl. No.: 18/425,965

(22) Filed: Jan. 29, 2024

(65) Prior Publication Data

US 2025/0247868 A1 Jul. 31, 2025

(51) Int. Cl.
*H04W 72/27* (2023.01)
*H04W 16/16* (2009.01)
*H04W 64/00* (2009.01)

(52) U.S. Cl.
CPC ........... *H04W 72/27* (2023.01); *H04W 16/16* (2013.01); *H04W 64/00* (2013.01)

(58) Field of Classification Search
CPC ..... H04W 72/27; H04W 16/16; H04W 64/00; H04W 72/0453; H04W 4/021; H04W 4/029; H04W 52/322; H04W 84/12
See application file for complete search history.

(56) References Cited

U.S. PATENT DOCUMENTS

| | | | | |
|---|---|---|---|---|
| 12,335,908 | B1 * | 6/2025 | Wu | H04W 64/003 |
| 2018/0324607 | A1 * | 11/2018 | Rengarajan | H04W 24/02 |
| 2022/0386311 | A1 * | 12/2022 | Furuichi | H04W 16/14 |
| 2023/0022388 | A1 * | 1/2023 | Desai | H04W 16/14 |
| 2023/0379840 | A1 * | 11/2023 | Wang | H04L 5/0073 |
| 2023/0388962 | A1 * | 11/2023 | Palayur | H04W 52/283 |
| 2024/0098615 | A1 * | 3/2024 | Anantharaman | H04W 40/10 |
| 2025/0301451 | A1 * | 9/2025 | Mohamed Hassan Salem | H04W 72/51 |

* cited by examiner

*Primary Examiner* — Tejis Daya
(74) *Attorney, Agent, or Firm* — Sheppard Mullin Richter & Hampton LLP

(57) ABSTRACT

Examples of the presently disclosed technology provide a methodology for enabling APs to broadcast 6 GHz communications in the Standard Power mode more quickly while awaiting an Automated Frequency Coordination (AFC) response from an AFC vendor. Examples can also enable an AP that is unable to send an AFC query to an AFC vendor (e.g., because the AP cannot obtain its own GPS coordinates) to broadcast 6 GHz communications in the Standard Power mode. To realize these advantages, examples provide a methodology for sharing an AFC response received by a first AP in a WLAN deployment with other APs in the WLAN deployment. The other APs can then leverage the shared AFC response to enable 6 GHz communication in the Standard Power mode while they wait for their own AFC responses from the AFC vendor.

16 Claims, 8 Drawing Sheets

AFC OPTIMIZATION FOR WLAN DEPLOYMENTS

BACKGROUND

A computer network (sometimes referred to as a "network") may comprise a variety of network devices (e.g., access points, controllers, gateways, switches, etc.) which perform various networking operations. For example, a Wireless Local Area Network (WLAN) deployment may comprise a plurality of access points (APs) that perform networking operations such as providing network access, performing authentication, routing network traffic to provide connectivity, etc. Client devices (e.g., laptops, personal computers, smartphones, etc.) connect to network devices to exchange data with a network. Network devices and client devices may be examples of wireless communication devices that exchange wireless communication signals over a network.

The IEEE 802.11 standards provide several distinct radio frequency (RF) ranges (sometimes referred to herein as frequency bands) for use in WLAN communications. Examples of frequency bands include the 2.4 GHz frequency band, the 5 GHz frequency band, and the recently opened 6 GHz frequency band. Federal Communications Commission (FCC) guidance relating to wireless communication protocols for the 6 GHz frequency band may be referred to herein as the 6 GHz standard.

Automated Frequency Coordination (AFC) is a spectrum use coordination system that consists of a registered database of frequency bands used by various types of radio frequency services in a geographical region. The FCC has approved certain companies—referred to herein as AFC vendors—to provide AFC services to APs and other wireless communication devices seeking to utilize the 6 GHz frequency band.

BRIEF DESCRIPTION OF THE DRAWINGS

The present disclosure, in accordance with one or more various examples, is described in detail with reference to the following figures. The figures are provided for purposes of illustration only and merely depict examples.

Figure 1:
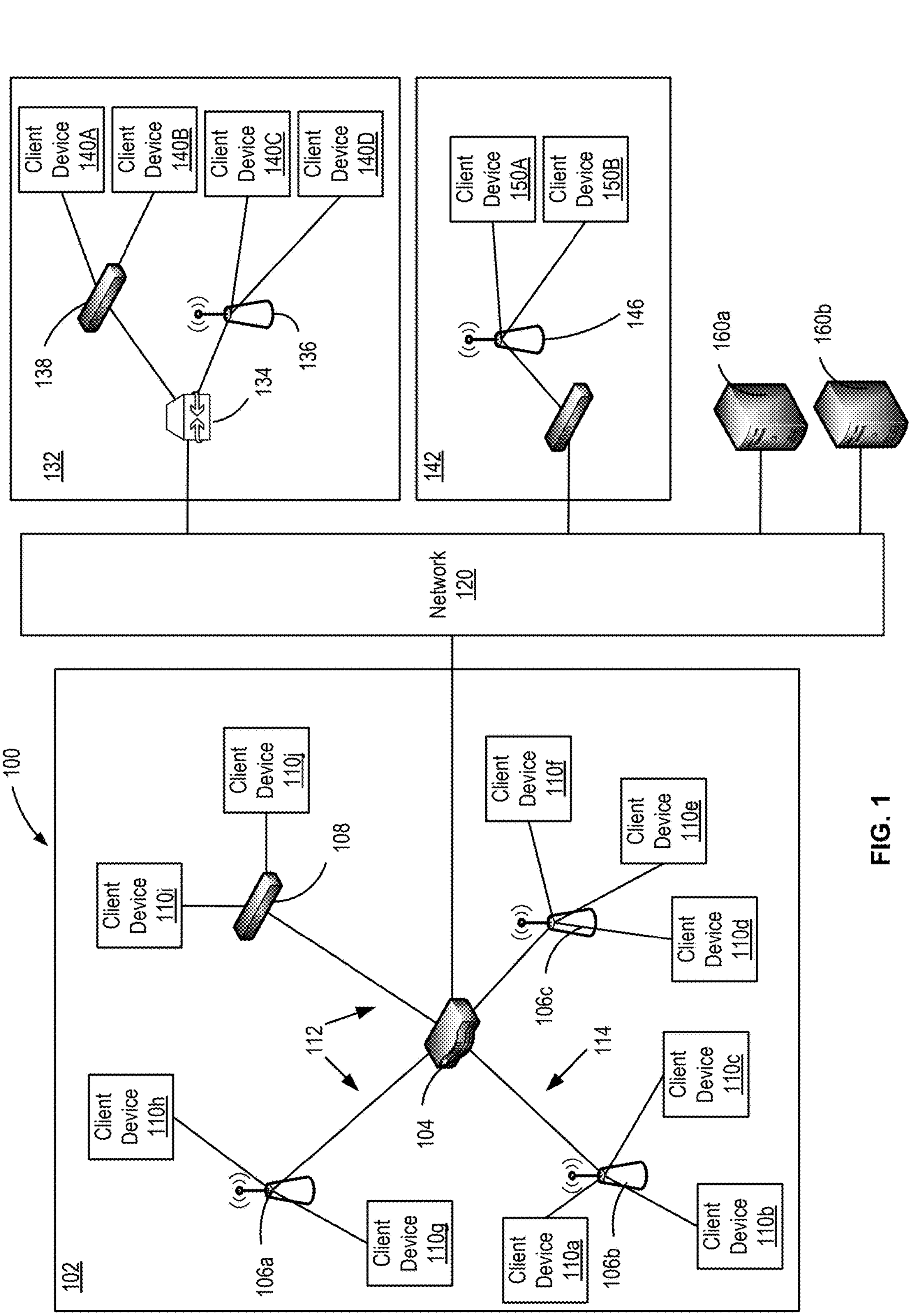
FIG. 1 illustrates an example network deployment within which various examples of the presently disclosed technology may be implemented.

The figures are not exhaustive and do not limit the present disclosure to the precise form disclosed.

DETAILED DESCRIPTION

Before broadcasting over the 6 GHz frequency band in a "Standard Power" mode (sometimes referred to as an "Outdoor Power" mode), the 6 GHz standard indicates an AP should: (1) send an AFC query to an approved AFC vendor; and (2) receive a response to the AFC query from the AFC vendor. The AFC query should contain global positioning system (GPS) coordinates of the querying AP. The response from the AFC vendor (referred to herein as an AFC response) should indicate: (a) channels the querying AP is allowed to broadcast 6 GHz communications over in the Standard Power mode, and (b) a maximum allowable power level the querying AP is allowed to use when broadcasting 6 GHz communications in the Standard Power mode. The AFC vendor can determine the allowable channels and maximum allowable power level by consulting a Universal Licensing System (ULS) for geographical locations of incumbents that have priority in the 6 GHz frequency band. Based on the geographical locations of such incumbents, the AFC vendor could configure the AFC response to indicate protected geographical regions where the querying AP is not permitted to broadcast 6 GHz communications in the Standard Power mode.

It can often take several minutes for an AP to collect its GPS coordinates for an AFC query, send the AFC query to an AFC vendor, and receive an AFC response from the queried AFC vendor. This time lag can be especially acute for large enterprise WLAN deployments with many querying APs. As alluded to above, under the 6 GHz standard, an AP is generally not permitted to broadcast 6 GHz communications in the Standard Power mode until the AP receives an AFC response indicating allowable channels and maximum allowable power level. Accordingly, many APs experience non-insignificant delays before they can broadcast 6 GHz communications in the Standard Power mode. Moreover, if an AP is unable to obtain accurate GPS coordinates (e.g., because the AP is located inside or otherwise has its line-of-sight to a satellite obstructed), the AP may not be able to send a valid AFC query, and thus may not be able to broadcast 6 GHz communications in the Standard Power mode as it will be unable to complete the conventional 6 GHz standard-prescribed process.

Against this backdrop, examples of the presently disclosed technology provide a methodology for enabling APs to broadcast 6 GHz communications in the Standard Power mode more quickly while awaiting an AFC response from an AFC vendor. Examples can also enable an AP that is unable to send an AFC query to an AFC vendor (e.g., because the AP cannot obtain its own GPS coordinates) to broadcast 6 GHz communications in the Standard Power mode.

To realize these advantages, examples provide a methodology for sharing an AFC response received by a first AP in a WLAN deployment with other APs in the WLAN deployment. The other APs in the WLAN deployment can then leverage the shared AFC response to enable 6 GHz communication in the Standard Power mode while they wait for their own AFC responses from the AFC vendor.

For example, a first AP in a WLAN deployment can receive an AFC response from an AFC vendor. The AFC response may indicate one or more allowable channels and a maximum allowable power level for broadcasting 6 GHz communications in the Standard Power mode. The first AP can then send, to neighbor APs in the WLAN deployment, a "collaborative AFC response packet" indicating the one or more allowable channels and the maximum allowable power level for broadcasting 6 GHZ communications in the Standard Power mode.

While waiting for their own AFC responses, the neighbor APs can leverage the collaborative AFC response packet to enable 6 GHz communication in the Standard power mode in the interim.

In certain implementations, the AFC response received by the first AP may further indicate information related to protected geographical regions where broadcasting 6 GHz communications in the Standard Power mode is not permitted. In these implementations, the first AP may determine a safe zone geographical region where broadcasting 6 GHz communications in the Standard Power mode is permitted (e.g., a 2-D radius around the first AP). Information related to the determined safe zone geographical region may be included in the collaborative AFC response packet sent to neighbor APs. Using this information, the neighbor APs can determine whether they are located within the determined safe zone geographical region, and only enable 6 GHz communication in the Standard Power mode if they are located within the determined safe zone geographical region. For instance, a neighbor AP that receives the collaborative AFC response packet can determine whether a distance between the first AP and the neighbor AP is less than a safe zone radius around the first AP indicated in the collaborative AFC response packet. If the distance between the first AP and the neighbor AP is less than the safe zone radius, the neighbor AP can enable 6 GHz communication while it waits for its own AFC response from the AFC vendor.

In certain implementations, instead of (or in addition to) sending the collaborative AFC response packet to neighbor APs, the first AP can send the collaborative AFC response packet to a central entity that manages APs in the WLAN deployment (e.g., a controller or a cloud-based manager). The central entity can then disseminate the collaborative AFC response packet to the other APs in the WLAN deployment.

As alluded to above, examples of the presently disclosed technology provide many advantages. For instance, examples enable APs to broadcast 6 GHz communications in the Standard Power mode more quickly while awaiting an AFC response from an AFC vendor. Examples can also enable an AP that is unable to send an AFC query to an AFC vendor (e.g., because the AP cannot obtain its own GPS coordinates) to broadcast 6 GHz communications in the Standard Power mode. Relatedly, by enabling APs to broadcast 6 GHz communications in the Standard Power mode more quickly (and in some cases, enabling APs that would otherwise be unable to broadcast 6 GHz communications to do so), examples can improve the functioning of APs and increase efficiencies in the technical field of wireless communication (e.g., reduce data latencies, improve data transmission times, improve and expand wireless communication channel usage, etc.).

Before describing examples of the presently disclosed technology in detail, it is useful to describe an example network installation within which examples might be implemented. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network (e.g., a WLAN deployment), which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site 102 may include multiple controllers and/or multiple communication points with network 120. In some examples, the controller 104 communicates with the network 120 through a router (not illustrated). In other examples, the controller 104 provides router functionality to the devices in the primary site 102.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106 *a-c*. Switches 108 and wireless APs 106 *a-c* provide network connectivity to various client devices 110 *a-j*. Using a connection to a switch 108 or AP 106 *a-c*, a client device 110 *a-j* may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IoT) devices, and the like. Client devices may also be referred to as stations (STA).

Within the primary site 102, a switch 108 is included as one example of a point of access to the network established in primary site 102 for wired client devices 110 *i-j*. Client devices 110 *i-j* may connect to the switch 108 and through the switch 108, may be able to access other devices within the network configuration 100. The client devices 110 *i-j* may also be able to access the network 120, through the switch 108. The client devices 110 *i-j* may communicate with the switch 108 over a wired 112 connection. In the illustrated example, the switch 108 communicates with the controller 104 over a wired 112 connection, though this connection may also be wireless.

Wireless APs 106 *a-c* are included as another example of a point of access to the network established in primary site 102 for client devices 110 *a-h*. The APs 106 *a-c* may control network access of the client devices 110 *a-h* and may authenticate the client devices 110 *a-h* for connecting to the APs and through the APs, to other devices within the network configuration 100. Each of APs 106 *a-c* may be a combination of hardware, software, and/or firmware that is configured to provide wireless network connectivity to wireless client devices 110 *a-h*. In the illustrated example, APs 106 *a-c* can be managed and configured by the controller 104. APs 106 *a-c* communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140 *a-d*.

In various examples, the remote site 132 may be in direct communication with the primary site 102, such that client devices 140 *a-d* at the remote site 132 access the network resources at the primary site 102 as if these the clients devices 140 *a-d* were located at the primary site 102. In such examples, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various examples, the network configuration 100 may include one or more smaller remote sites 142, comprising only a gateway device 144 for communicating with the network 120 and a wireless AP 146, by which various client devices 150 *a-b* access the network 120. Such a remote site 142 may represent, for example, an individual employee's home or a temporary remote office. The remote site 142 may also be in communication with the primary site 102, such that the client devices 150 *a-b* at the remote site 142 access network resources at the primary site 102 as if these client devices 150 *a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160 *a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160 *a-b*. Content servers 160 *a-b* may include various providers of multimedia downloadable and/or streaming content, including audio, video, graphical, and/or text content, or any combination thereof. Examples of content servers 160 *a-b* include, for example, web servers, streaming radio and video providers, and cable and satellite television providers. The client devices 110 *a-j*, 140 *a-d*, 150 *a-b* may request and access the multimedia content provided by the content servers 160 *a-b*.

Figure 2A:
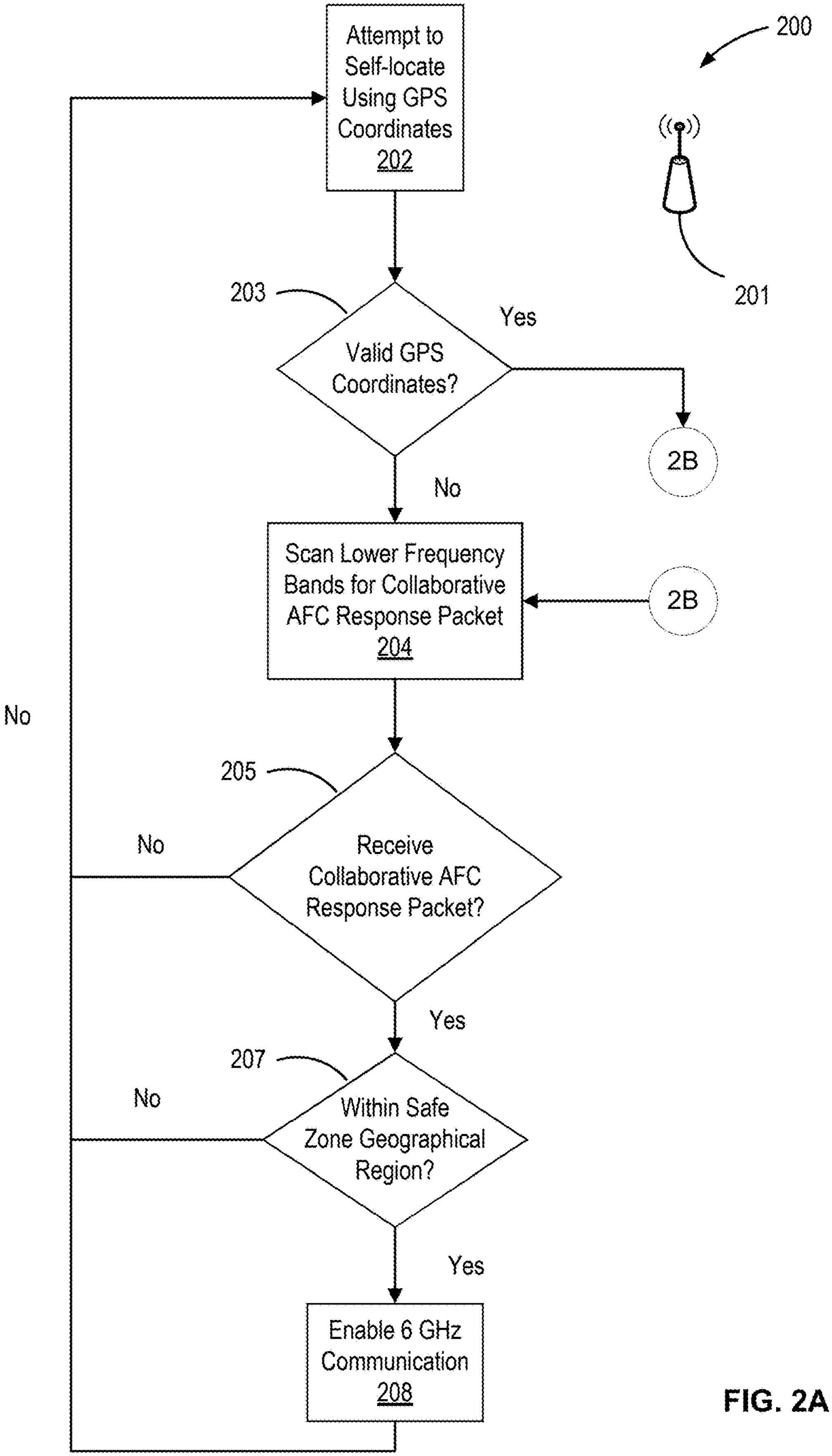
FIGS. 2A-2B illustrate an example method for sharing an AFC response received by a first AP in a WLAN deployment with other APs in the WLAN deployment, in accordance with various examples of the presently disclosed technology.
Figure 2B:
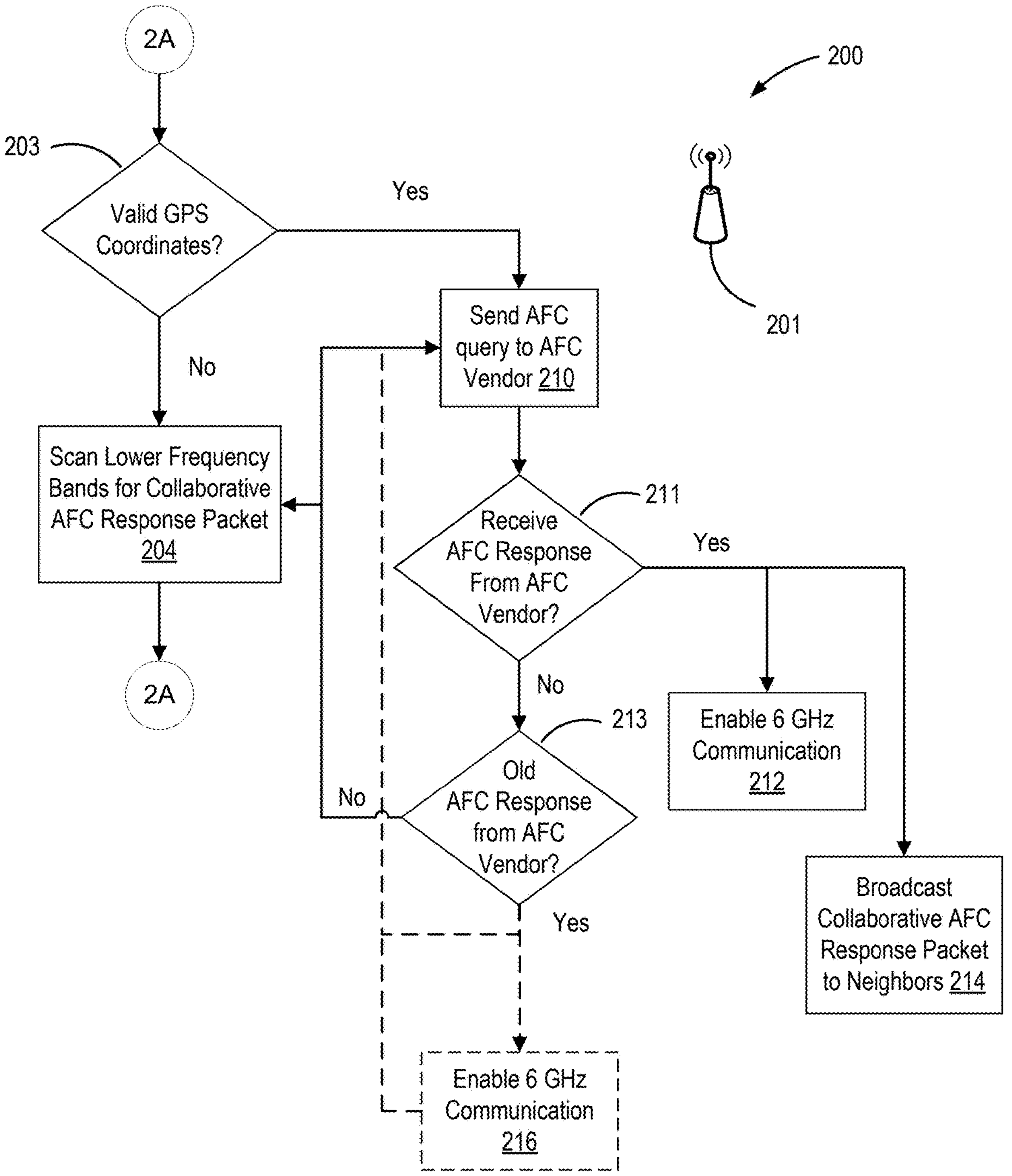

FIGS. 2A-2B illustrate an example method for sharing an AFC response received by a first AP in a WLAN deployment with other APs in the WLAN deployment, in accordance with various examples of the presently disclosed technology. While certain blocks of the example method are depicted in both of FIGS. 2A-2B (i.e., blocks 203 and 204) other blocks are just depicted once for brevity/conciseness.

The method may be executed by an AP 201 within a WLAN deployment 200. In general, the method can be implemented by processing resource(s) or computing device (s) through any suitable hardware, a non-transitory machine readable medium, or combination thereof. In an example, the method may be performed by computer-readable instructions, which include instructions stored on a medium and executable by a processing resource, such as a hardware processor of a computing device/component. It may be understood that processes involved in the method can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

As depicted, at block 202, AP 201 can attempt to self-locate using GPS coordinates. As alluded to above, AP 201 may need to self-locate using GPS coordinates in order to provide its GPS coordinates in an AFC query sent to an AFC vendor. If AP 201 is unable to self-locate using GPS coordinates (or is otherwise unable to obtain its GPS coordinates), AP 201 may not be able to send a valid AFC query—and thus may not be able to complete the conventional 6 GHZ standard-prescribed procedure for enabling 6 GHz communication in the Standard Power mode. There can be various reasons that AP 201 may not be able to self-locate using GPS coordinates. For instance, AP 201 may be located inside away from a window, or otherwise have its line-of-sight to a satellite obstructed (e.g., AP 201 may be located in a city environment surrounded by tall buildings).

As alluded to above, conventionally if AP 201 is unable to self-locate using GPS coordinates—and thus unable to send an AFC query—AP 201 would not be able to broadcast 6 GHz communications in the Standard Power mode. However, examples of the presently disclosed technology can enable AP 201 to broadcast 6 GHZ communications in the Standard Power mode even if AP 201 is unable to send an AFC query. Examples realize this improvement by providing a methodology for sharing an AFC response received by a first AP in WLAN deployment 200 with other APs (e.g., AP 201) in WLAN deployment 200. The other APs (e.g., AP 201) can then leverage the shared AFC response to enable 6 GHz communication in the Standard Power mode if they are unable to complete the conventional 6 GHz standard-prescribed process for enabling 6 GHz communication. Moreover, even if the other APs are able to send valid AFC queries to the AFC vendor, they can leverage the shared AFC response to enable 6 GHz communication in the Standard Power mode while they wait for their own AFC responses from the AFC vendor (such a procedure is described in greater detail below).

In accordance with above, if at block 203 AP 201 is able to self-locate with GPS coordinates, AP 201 can send an AFC query to an AFC vendor at block 204 (this procedure is described in greater detail below).

If however AP 201 is unable to self-locate with GPS coordinates, at block 204, AP 201 can scan lower frequency bands (e.g., the 2.4 GHz or 5 GHz frequency band) for a collaborative AFC response packet sent by another AP in WLAN deployment 200 and/or a central entity that manages APs in WLAN deployment 200.

In some implementations, AP 201 can scan the lower frequency bands for a collaborative AFC response packet without splitting chains/antennas. For instance, AP 201 may be an AP with dedicated radio capabilities. Accordingly, AP 201 may devote a dedicated radio to repetitively (and in some cases, constantly) scan the lower frequency bands for a collaborative AFC response packet when AP 201 does not have a recent/fresh AFC response from an AFC vendor. In still further examples (e.g., where AP 201 is unable to split chains and/or dedicate a radio for scanning the lower frequency bands for a collaborative AFC response packet), AP 201 may only scan the lower frequency bands for a collaborative AFC response packet at repetitive but discrete intervals. Accordingly, AP 201 can better balance devoting resources to networking functions. At should be understood that in other implementations AP 201 can scan the lower frequency bands for a collaborative AFC response packet using other techniques.

Referring again to the collaborative AFC response packet, as used herein a "collaborative AFC response packet" may refer to a wireless communication sent by a non-AFC vendor (e.g., an AP or a central entity that manages APs) that contains information related to an AFC response sent by an AFC vendor. In various implementations, the collaborative AFC response packet may comprise an Internet Protocol (IP) packet that encapsulates such information.

As alluded to above, an AFC response may refer to a wireless communication sent by an AFC vendor (i.e., an approved company that provides AFC services, or more specifically, a computerized system of the approved company that provides AFC services) to an AP that sent an AFC query to the AFC vendor. The AFC response will typically indicate: (a) channels the querying AP is allowed to broadcast 6 GHz communications over in the Standard Power mode, and (b) a maximum allowable power level the querying AP is allowed to use when broadcasting 6 GHz communications in the Standard Power mode. The AFC vendor can determine the allowable channels and maximum allowable power level by consulting a Universal Licensing System (ULS) for geographical locations of incumbents that have priority in the 6 GHz frequency band.

Figure 6:
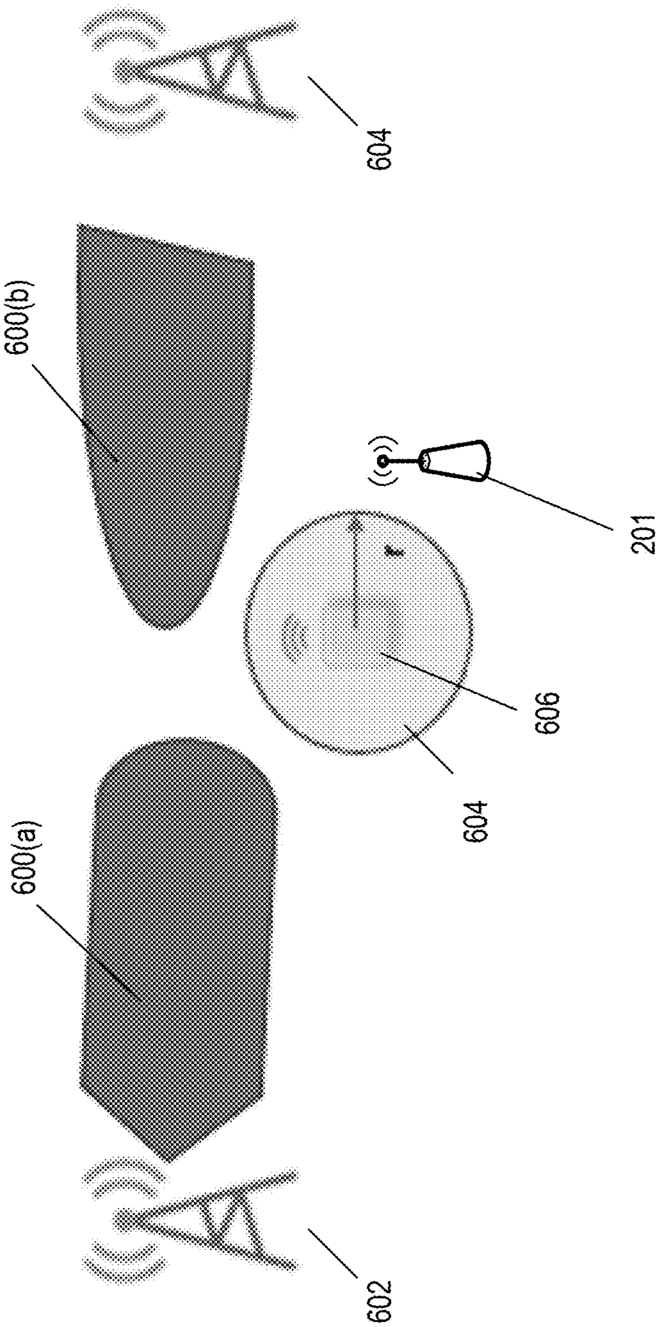
FIG. 6 depicts an example safe zone geographical region, in accordance with various examples of the presently disclosed technology

The 6 GHz standard also permits an AFC vendor to include other information in an AFC response. For example, an AFC vendor could configure the AFC response to indicate information related to protected geographical regions where the querying AP is not permitted to broadcast 6 GHz communications in the Standard Power mode. Examples of protected geographical regions are depicted in FIG. 6. Namely, FIG. 6 depicts protected geographical regions 600(*a*) and 600(*b*). The AFC vendor can determine protected geographical regions 600(*a*) and 600(*b*) based on the geographical locations of incumbents 602 and 604 respectively. As alluded to above, incumbents 602 and 604 may be radio broadcasters that have priority in the 6 GHz frequency band.

The information related to the protected geographical regions indicated/included in the AFC response can take various forms. As an illustrative example, such information could comprise a 2-D contour map that defines the protected geographical regions in terms of GPS coordinates.

In accordance with above, a collaborative AFC response packet may indicate one or more allowable channels (as indicated in an AFC response received by an AFC response receiving-AP in WLAN deployment 200) and a maximum allowable power level (as indicated in the AFC response received by the AFC response receiving-AP in WLAN deployment 200) for broadcasting wireless communications over the 6 GHz frequency band in the Standard Power mode. As alluded to above, in certain implementations, the collaborative AFC response packet may further indicate information related to protected geographical regions (as indicated in the AFC response received by the AFC response receiving-AP in WLAN deployment 200) where broadcasting the wireless communications over the 6 GHz frequency band in the Standard Power mode is not permitted.

To provide more useful/valuable information to other APs in WLAN deployment 200, the AFC response receiving-AP may determine/compute a safe zone geographical region where broadcasting the wireless communications over the 6 GHz frequency band in the Standard Power mode is permitted. FIG. 6 depicts an example safe zone geographical region 604. As depicted in FIG. 6, an example AP 606 (which may be an AP in WLAN deployment 200) can determine/compute safe zone geographical region 604 based on protected geographical regions 600(*a*) and 600(*b*) (or more specifically, the information related to protected geographical regions 600(*a*) and 600(*b*) received in an AFC response received by AP 606). AP 606 can define safe zone geographical region 604 in various forms. As an illustrative example, AP 606 can define safe zone geographical region 604 using a 2-D radius around AP 606. As another illustrative example, AP 606 can define safe zone geographical region 604 as a 2-D contour map using GPS coordinates.

In some scenarios, AP 201 may receive multiple collaborative AFC response packets (e.g., sent from multiple other APs in WLAN deployment 200) while scanning the lower frequency bands for a collaborative AFC response packet. To address this scenario, examples can utilize various protocols for AP 201 to determine which collaborative AFC response packet to utilize/leverage. As an illustrative example, a first protocol may specify that AP 201 utilize/leverage a collaborative AFC response packet that indicates the largest safe zone geographical region, or a safe zone geographical region that permits AP 201 to broadcast 6 GHz communications in the Standard Power mode over the largest geographical region. A second example protocol may take a more conservative approach, and specify that AP 201 utilize/leverage a collaborative AFC response packet that indicates the smallest safe zone geographical region, or a safe zone geographical region that permits AP 201 to broadcast 6 GHz communications in the Standard Power mode over the smallest geographical region. A third example protocol may specify that AP 201 utilize/leverage the most recent collaborative AFC response packet it receives, and so on.

Referring again to FIGS. 2A-2B, if AP 201 does not receive a collaborative AFC packet at block 205, AP 201 can return to block 202 and repeat the above-described methodology.

If however, AP 201 receives a collaborative AFC response packet (i.e., in response to the scanning of block 204), AP 201 can next determine, at block 207, whether it is within a safe zone geographical region indicated in the collaborative AFC response packet. AP 201 can make this determination in various ways. For example, if the collaborative AFC response packet defines the safe zone geographical region as a 2-D radius around AP 606 from FIG. 6, AP 201 can determine whether a distance between AP 201 and AP 606 is less than the 2-D radius. AP 201 can determine the distance between AP 201 and AP 606 in various ways such as pathloss/RSSI readings, through ranging data, through known topology of WLAN deployment 200, and/or other ranging techniques (e.g., Bluetooth location techniques, angle of arrival/angle of departure techniques, etc.).

If AP 201 is not within the safe zone geographical region indicated in the collaborative AFC response packet, AP 201 can return to block 202 and repeat the above-described methodology.

If however AP 201 is within the safe zone geographical region indicated in the collaborative AFC response packet, AP 201 can enable 6 GHz communication and broadcast 6 GHz communications in the Standard Power mode at block 208. Here, AP 201 may still return to block 202 and repeat the above-described methodology. This may be the case to comply with the 6 GHz standard, which indicates AP 201 should obtain—or at least attempt to obtain—its own AFC response directly from an AFC vendor. Such an AFC response, if received, may override the collaborative AFC response packet.

Referring now to the branch of the methodology depicted in FIG. 2B, if at block 203 AP 201 is able to self-locate with GPS coordinates, at block 210 AP 201 can send an AFC query to an AFC vendor.

The AFC query may include the GPS coordinates of AP 201. In certain implementations, the AFC query may also include AP 201's FCCID, AP 201's serial number, and various other Vendor Specific Elements (VSEs) specified by an AFC vendor. Such VSEs may include, as illustrative examples, statistics related to how many times AP 201 has sent AFC queries, whether AP 201 has reached a negotiated AFC query threshold, etc.

If at block 211 AP 201 does not receive an AFC response from the AFC vendor, AP 201 can next determine, at block 213, whether it has an old AFC response from the AFC vendor. In general, the 802.11 standard permits an AP to use an AFC response from an AFC vendor for 24 hours. After this 24 hour-period has expired however, the AP should send (or attempt to send) an AFC query to the AFC vendor for a new AFC response.

Accordingly, in certain implementations, if AP 201 has an old AFC response (i.e., an AFC response received more than 24 hours prior), AP 201 can perform operation 216 to enable 6 GHz communication based on the old AFC response while it waits for a new (i.e., fresh) AFC response. Accordingly, in these implementations, after enabling 6 GHz communication, AP 201 may return to block 210 and repeat the above-described methodology. In other implementations however, if AP 201 has an old AFC response (i.e., an AFC response received more than 24 hours prior), AP 201 may return to block 210 and repeat the above-described procedure without enabling 6 GHZ communication.

As depicted, if AP 201 does not have an old AFC response, AP 201 can: (1) return to block 210; and/or (2) scan lower frequencies for a collaborative AFC response packet at block 204.

Referring again to block 211, if AP 201 receives an AFC response from the AFC vendor, AP 201 can, at block 212, enable 6 GHz communication and broadcast 6 GHz communications as needed.

Relatedly, at block 214, AP 201 can broadcast a collaborative AFC response packet to neighbors in WLAN deployment 200. As described above, the collaborative AFC response packet may indicate one or more allowable channels (as indicated in the AFC response received by AP 201) and a maximum allowable power level (as indicated in the AFC response received by AP 201) for broadcasting wireless communications over the 6 GHz frequency band in the Standard Power mode. In certain implementations, the collaborative AFC response packet may further indicate information related to protected geographical regions (as indicated in the AFC response received by AP 201) where broadcasting the wireless communications over the 6 GHz frequency band in the Standard Power mode is not permitted.

To provide more useful/valuable information to other APs in WLAN deployment 200, AP 201 may determine/compute a safe zone geographical region where broadcasting the wireless communications over the 6 GHz frequency band in the Standard Power mode is permitted. AP 201 can define the safe zone geographical region in various forms. As an illustrative example, AP 201 can define the safe zone geographical region using a 2-D radius around AP 201. As another illustrative example, AP 201 can define the safe zone geographical region as a 2-D contour map using GPS coordinates.

As alluded to above, AP 201 can broadcast the collaborative AFC response packet on a lower frequency band than 6 GHZ (e.g., the 2.4 GHz or 5 GHz frequency band). Accordingly, APs which have not yet enabled 6 GHz communication may receive the collaborative AFC response packet when scanning channels of these lower frequency bands.

In certain implementations, the neighbors that AP 201 broadcasts the collaborative AFC response packet to may comprise one or more other APs in WLAN deployment 200. In other implementations, the neighbors that AP 201 broadcasts the collaborative AFC response packet to may comprise a central entity (e.g., a controller such as controller 104 in FIG. 1, a cloud-based central management entity, etc.) that manages APs in WLAN deployment 200. Accordingly, that central entity may share the collaborative AFC response packet with the other APs in WLAN deployment 200. In still further implementations, the neighbors that AP 201 broadcasts the collaborative AFC response packet to may comprise a combination of one or more other APs in WLAN deployment 200 and the central entity.

AP 201 can use various techniques to determine/identify the neighbors it broadcasts the collaborative AFC response packet to.

For instance, in certain implementations APs in WLAN deployment 200 (including AP 201) can use the lower frequency bands (either 2.4 GHz or 5 GHz or both) to trigger a background scanning on each radio or a dedicated non-beaconing radio (i.e., a radio that does not have active virtual APs sending beacons and serving clients). On scanned channels, the APs can send management frames indicating that they are a part of WLAN deployment 200. Such management frames may comprise a beacon with a field (or fields) that allows a respective AP to indicate that it is a part of WLAN deployment 200. Such field(s) may also allow the respective AP to indicate other identifying and/or location information. Accordingly, an independent process on each AP can determine/generate a list of neighbor APs based on the management frames it receives. In some of the above-described implementations, the APs can also send management frames in order to share their list of neighbor APs with other APs in WLAN deployment 200. Within WLAN deployment 200, this sharing of the neighbor AP list can further save processing resources, processing time, power consumption, etc.

In some implementations, the list of neighbor APs can be sent to APs in WLAN deployment 200 by a central entity (e.g., a controller such as controller 104 in FIG. 1, a cloud-based central management entity, etc.) that manages APs in WLAN deployment 200.

Figure 3:
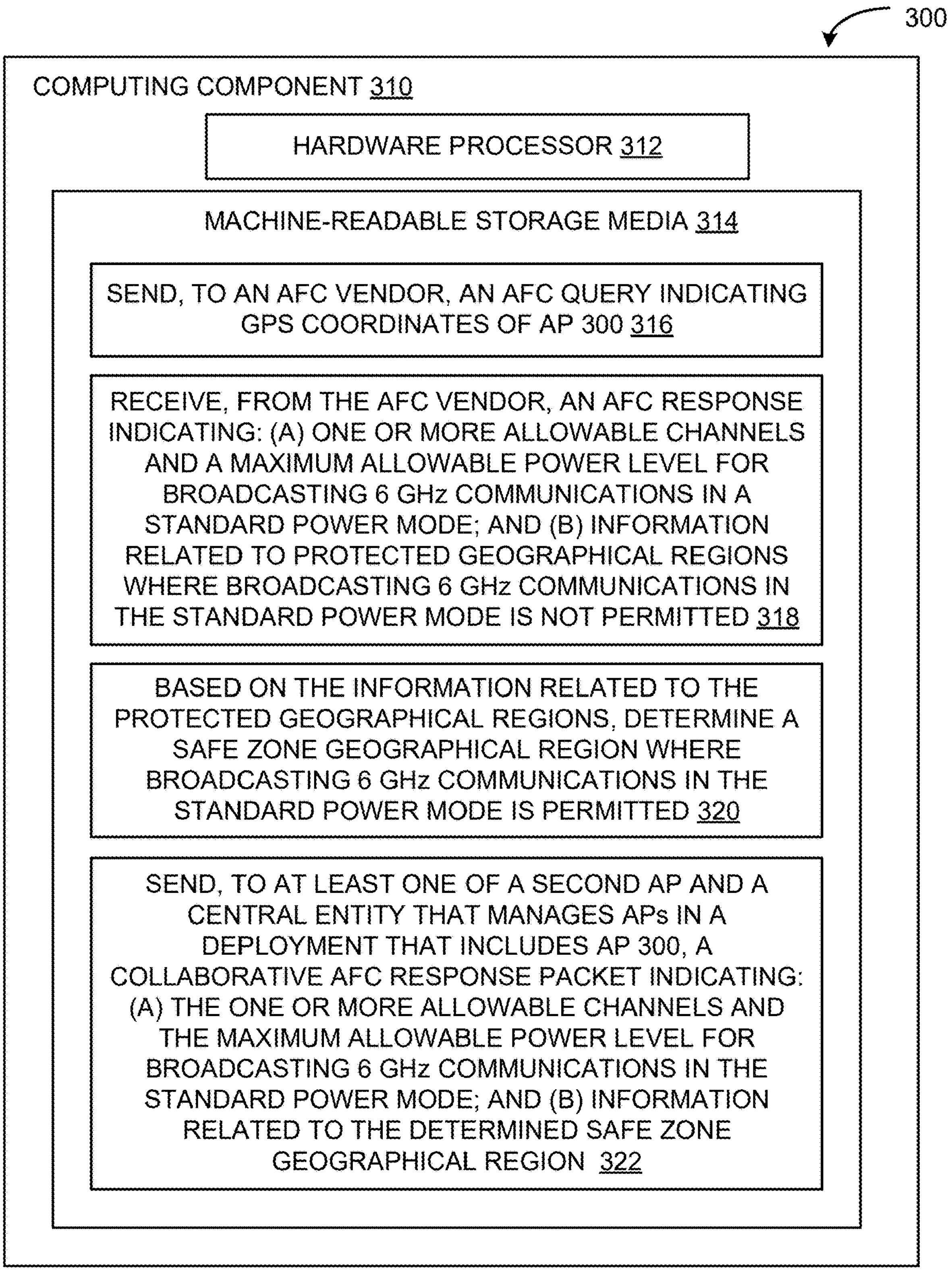
FIG. 3 depicts an example AP that shares a received AFC response with other APs in a WLAN deployment, in accordance with various examples of the presently disclosed technology.

FIG. 3 depicts an example AP 300 that shares a received AFC response with other APs in a WLAN deployment, in accordance with various examples of the presently disclosed technology.

Referring now to FIG. 3, as depicted AP 300 may comprise a computing component 310. Computing component 310 may be, for example, a server computer, a controller, or any other similar computing component capable of processing data. In the example implementation of FIG. 3, the computing component 310 includes a hardware processor 312, and machine-readable storage medium for 314.

Hardware processor 312 may be one or more central processing units (CPUs), semiconductor-based microprocessors, and/or other hardware devices suitable for retrieval and execution of instructions stored in machine-readable storage medium 314. Hardware processor 312 may fetch, decode, and execute instructions, such as instructions 316-322, to control processes or operations for burst preloading for available bandwidth estimation. As an alternative or in addition to retrieving and executing instructions, hardware processor 312 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 314, may be any electronic, magnetic, optical, or other physical storage device that contains or stores executable instructions. Thus, machine-readable storage medium 314 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 314 may be a non-transitory storage medium, where the term "non-transitory" does not encompass transitory propagating indicators. As described in detail below, machine-readable storage medium 314 may be encoded with executable instructions, for example, instructions 316-322. Further, although the instructions shown in FIG. 3 are in an order, the shown order is not the only order in which the instructions may be executed. Any instruction may be performed in any order, at any time, may be performed repeatedly, and/or may be performed by any suitable device or devices.

As depicted, hardware processor 312 executes instruction 316 to cause AP 300 to send, to an AFC vendor, an AFC query indicating GPS coordinates of AP 300. As alluded to above, the AFC query may include additional information such as AP 300's FCCID, AP 300's serial number, and various other VSEs specified by the AFC vendor. Such VSEs may include, as illustrative examples, statistics related to how many times AP 300 has sent AFC queries, whether AP 300 has reached a negotiated AFC query threshold, etc.

Hardware processor 312 executes instruction 318 to cause AP 300 to receive, from the AFC vendor, an AFC response indicating: (a) one or more allowable channels and a maximum allowable power level for broadcasting wireless communications over a 6 GHz frequency band in a Standard Power mode; and (b) information related to protected geographical regions where broadcasting the wireless communications over the 6 GHz frequency band in the Standard Power mode is not permitted.

Based on the information related to the protected geographical regions, hardware processor 312 executes instruction 320 to cause AP 300 to determine a safe zone geographical region where broadcasting the wireless communications over the 6 GHz frequency band in the Standard Power mode is permitted. In certain implementations, AP 300 can define the determined safe zone geographical region as a 2-D radius around AP 300.

Hardware processor 312 executes instruction 322 to cause AP 300 to send, to at least one of a second AP and a central entity that manages APs in a WLAN deployment that includes AP 300, a collaborative AFC response packet. The collaborative AFC response packet may indicate: (a) the one or more allowable channels and the maximum allowable power level for broadcasting the wireless communications over the 6 GHz frequency band in the Standard Power mode; and (b) information related to the determined safe zone geographical region. As alluded to above, the information related to the determined safe zone geographical region may be defined as a 2-D radius around AP 300.

In various implementations, the collaborative AFC response packet may be sent over a lower frequency band than the 6 GHz frequency band. This way, neighbor APs which have not yet enabled 6 GHz communication can receive the collaborative AFC response packet when scanning the lower frequency band.

In certain implementations, prior to receiving the AFC response from the AFC vendor, hardware processor 312 can execute an instruction to cause AP 300 to scan a lower frequency band than the 6 GHz frequency band for a collaborative AFC response packet sent by at least one of another AP and the central entity that manages APs in the WLAN deployment that includes AP 300. AP 300 can then leverage this collaborative AFC response packet while AP 300 waits for its own AFC response from the AFC vendor.

In some implementations, responsive to receiving the AFC response from the AFC vendor, hardware processor 312 can execute an instruction to cause AP 300 to enable 6 GHz wireless communication and/or override any previously received AFC response from the AFC vendor or previously received collaborative AFC response packet.

Figure 4:
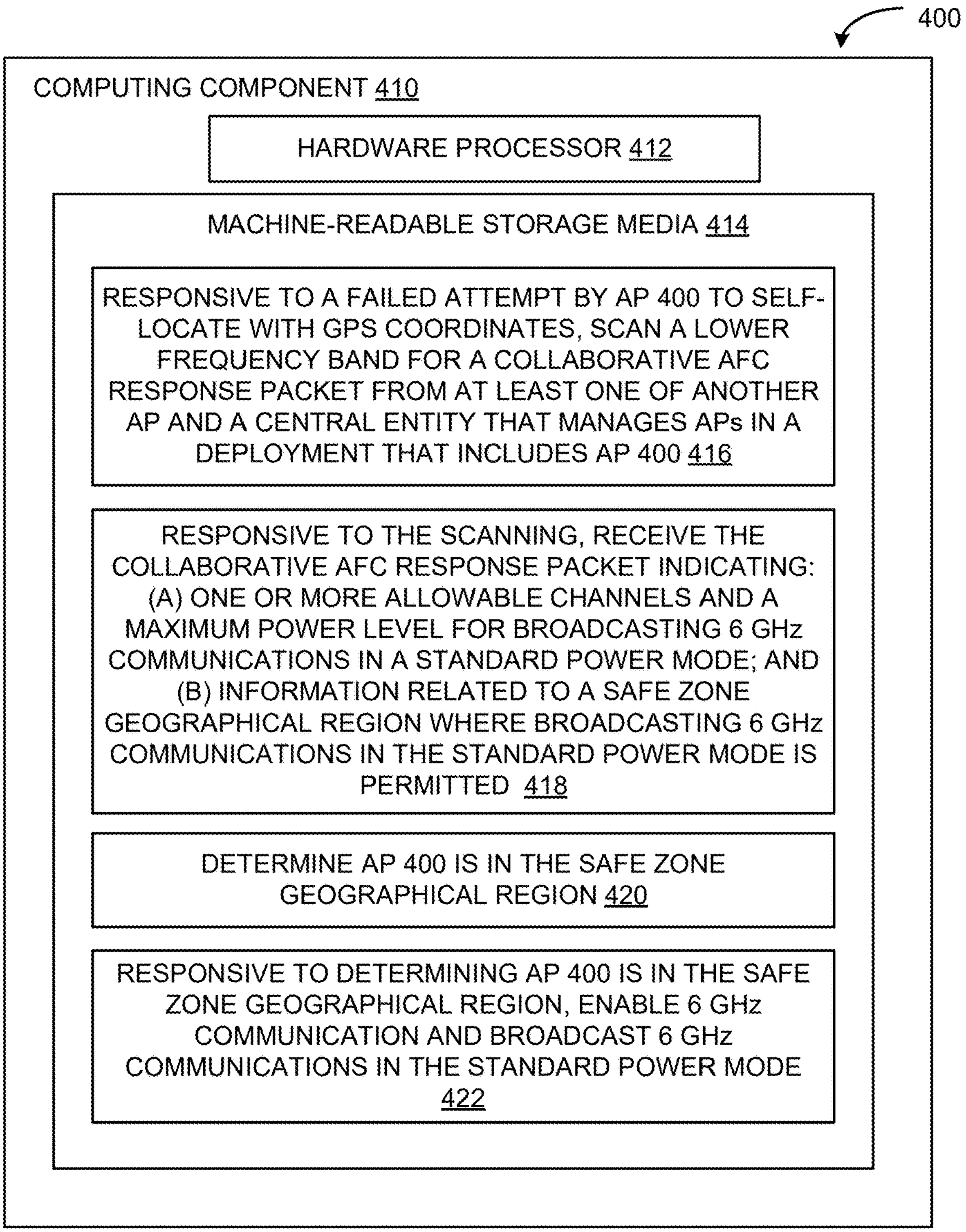
FIG. 4 depicts an example AP that uses a received collaborative AFC response packet to enable 6 GHz communication, in accordance with various examples of the presently disclosed technology.

FIG. 4 depicts an example AP 400 that uses a received collaborative AFC response packet to enable 6 GHz communication, in accordance with various examples of the presently disclosed technology.

As depicted, AP 400 comprises a computing component 410. Aside from its instructions 416-422, computing component 410 may be the same/similar as computing component 310 of AP 300. Accordingly, common elements of computing component 410 will not be described again in the interests of brevity.

Responsive to a failed attempt by AP 400 to self-locate with GPS coordinates, hardware processor 412 executes instruction 416 to cause AP 400 to scan a lower frequency band than the 6 GHz frequency band for a collaborative AFC response packet from at least one of a second AP and a central entity that manages APs in a WLAN deployment that includes AP 400.

Responsive to the scanning, hardware processor 412 executes instruction 418 to cause AP 400 to receive the collaborative AFC response packet. The collaborative AFC response packet may indicate: (a) one or more allowable channels and a maximum allowable power level for broadcasting wireless communications over a 6 GHz frequency band in a Standard Power mode; and (b) information related to a safe zone geographical region where broadcasting the wireless communications over the 6 GHz frequency band in the Standard Power mode is permitted. As alluded to above, the information related to the safe zone geographical region may comprise a 2-D radius around the second AP.

Hardware processor 412 executes instruction 420 to cause AP 400 to determine that AP 400 is within the safe zone geographical region. In implementations where the received information related to the safe zone geographical region comprises the 2-D radius around the second AP, determining that AP 400 is within the safe zone geographical region may comprise determining a distance between AP 400 and the second AP is less than the 2-D radius around the second AP.

Responsive to determining that AP 400 is within the safe zone geographical region, hardware processor 412 executes instruction 420 to cause AP 400 to enable 6 GHz communication and broadcast 6 GHz in the Standard Power mode as needed. Hardware processor 412 may execute a further instruction to cause AP 400 to override any previously received AFC response from an AFC vendor or previously received collaborative AFC response packet.

In certain implementations scanning the lower frequency band for the collaborative AFC response packet may be responsive to determining that AP 400 does not have an old AFC response from the AFC vendor. Here, determining whether AP 400 has an old AFC response from the AFC vendor may be responsive to waiting for a new AFC response from the AFC vendor.

Figure 5:
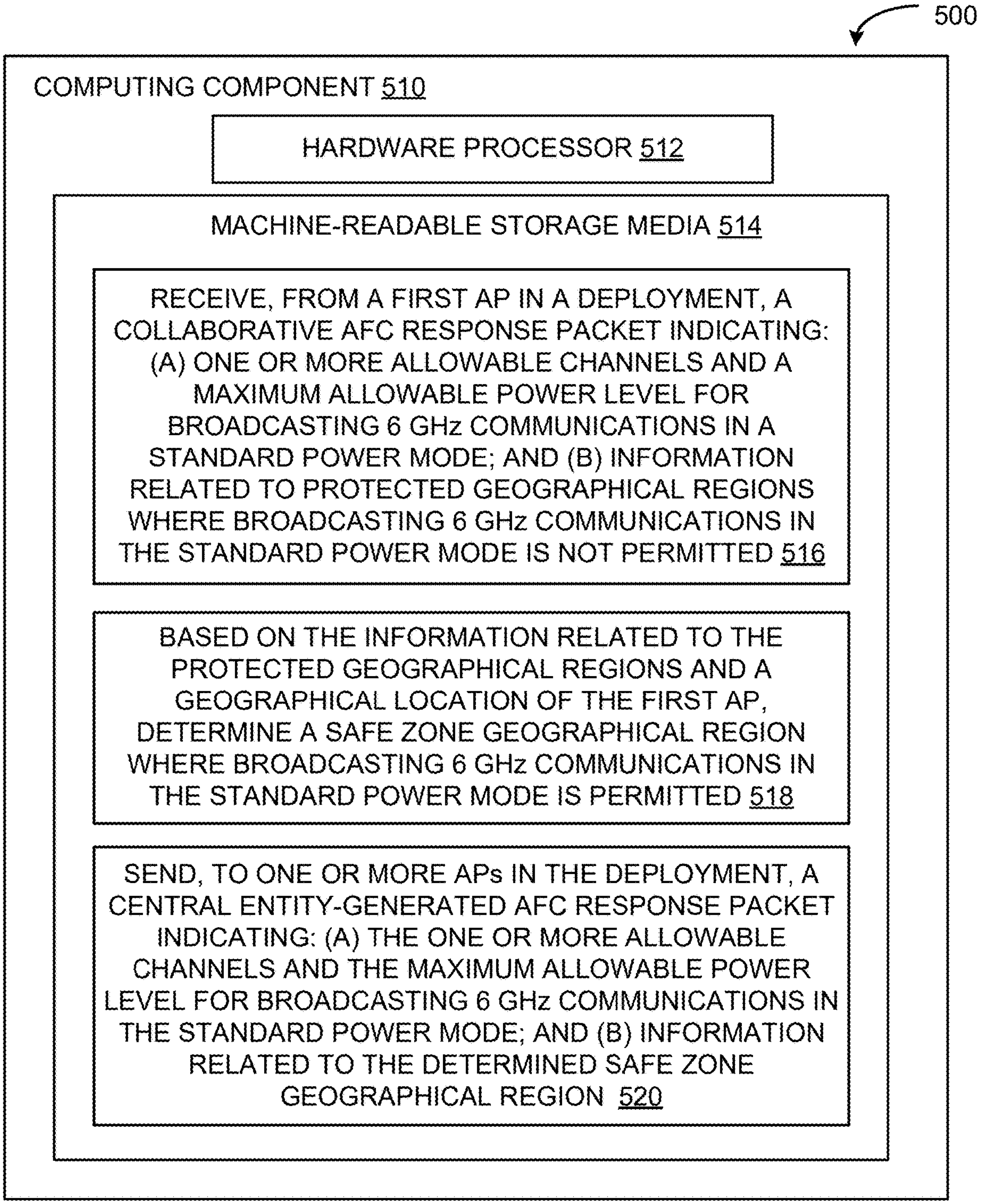
FIG. 5 depicts an example central entity that shares an AFC response received by a first AP in a WLAN deployment with other APs in the WLAN deployment, in accordance with various examples of the presently disclosed technology.

FIG. 5 depicts an example central entity 500 that shares an AFC response received by a first AP in a WLAN deployment with other APs in the WLAN deployment, in accordance with various examples of the presently disclosed technology. In certain implementations, central entity 500 may comprise a controller, such as controller 104 depicted in FIG. 1. In other implementations, central entity 500 may comprise a cloud-based management entity.

As depicted, central entity 500 comprises a computing component 510. Aside from its instructions 516-520, computing component 510 may be the same/similar as computing component 310 of AP 300. Accordingly, common elements of computing component 510 will not be described again in the interests of brevity.

Hardware processor 512 can execute instruction 516 to cause central entity 500 to receive, from a first AP in a WLAN deployment, a collaborative AFC response packet. The collaborative AFC response packet may indicate: (a) one or more allowable channels and a maximum allowable power level for broadcasting wireless communications over a 6 GHz frequency band in a Standard Power mode; and (b) information related to protected geographical regions where broadcasting the wireless communications over the 6 GHz frequency band in the Standard Power mode is not permitted. In some implementations, the information related to the protected geographical regions may comprise a 2-D contour map defined using GPS coordinates.

Based on the information related to the protected geographical regions and a geographical location of the first AP, hardware processor 512 can execute instruction 518 to cause central entity 500 to determine a safe zone geographical region within the WLAN deployment where broadcasting the wireless communications over the 6 GHz frequency band in the Standard Power mode is permitted. Central entity 500 may define the determined safe zone geographical region as a 2-D radius around the first AP.

Hardware processor 512 can execute instruction 518 to cause central entity 500 to send, to one or more other APs in the WLAN deployment (i.e., APs other than the first AP), a central entity-generated AFC response packet indicating: (a) the one or more allowable channels and the maximum allowable power level for broadcasting the wireless communications over the 6 GHz frequency band in the Standard Power mode; and (b) information related to the determined safe zone geographical region. As alluded to above, the information related to the determined safe zone geographical region may define a 2-D radius around the first AP.

As described above, FIG. 6 depicts an example safe zone geographical region 604, in accordance with various examples of the presently disclosed technology.

FIG. 6 also depicts protected geographical regions 600(*a*) and 600(*b*). An AFC vendor can determine protected geographical regions 600(*a*) and 600(*b*) based on the geographical locations of incumbents 602 and 604 respectively. As alluded to above, incumbents 602 and 604 may be radio broadcasters that have priority in the 6 GHZ frequency band.

As depicted in FIG. 6, an example AP 606 can determine/compute safe zone geographical region 604 based on protected geographical regions 600(*a*) and 600(*b*) (or more specifically, information related to protected geographical regions 600(*a*) and 600(*b*) indicated in an AFC response received by AP 606). AP 606 can define safe zone geographical region 604 in various forms. As an illustrative example, AP 606 can define safe zone geographical region 604 using a 2-D radius around AP 606. As another illustrative example, AP 606 can define safe zone geographical region 604 as a 2-D contour map using GPS coordinates.

An AP that receives a collaborative AFC response packet from AP 606 can determine whether the AP is within safe zone geographical region 604 before enabling 6 GHz communication based on the collaborative AFC response packet. For example, if AP 201 (also depicted in FIGS. 2A-2B) receives a collaborative AFC response packet from AP 606, AP 201 can determine whether AP 201 is within safe zone geographical region 604 by determining whether a distance between AP 606 and AP 201 is less than the 2-D radius around the AP 606. AP 201 can determine the distance between AP 606 and AP 201 in various ways such as pathloss/RSSI readings, through ranging data, through known topology of WLAN deployment 200, and/or other ranging techniques (e.g., Bluetooth location techniques, angle of arrival/angle of departure techniques, etc.).

It should be understood that principles of the presently disclosed technology can be applied beyond operation in the 6 GHz frequency band.

For instance, the methodologies described in conjunction with FIGS. 2A-2B, and 3-5 may be applied for operation in a prospective 7 GHz frequency band, a prospective 8 GHz frequency band, and so on.

Figure 7:
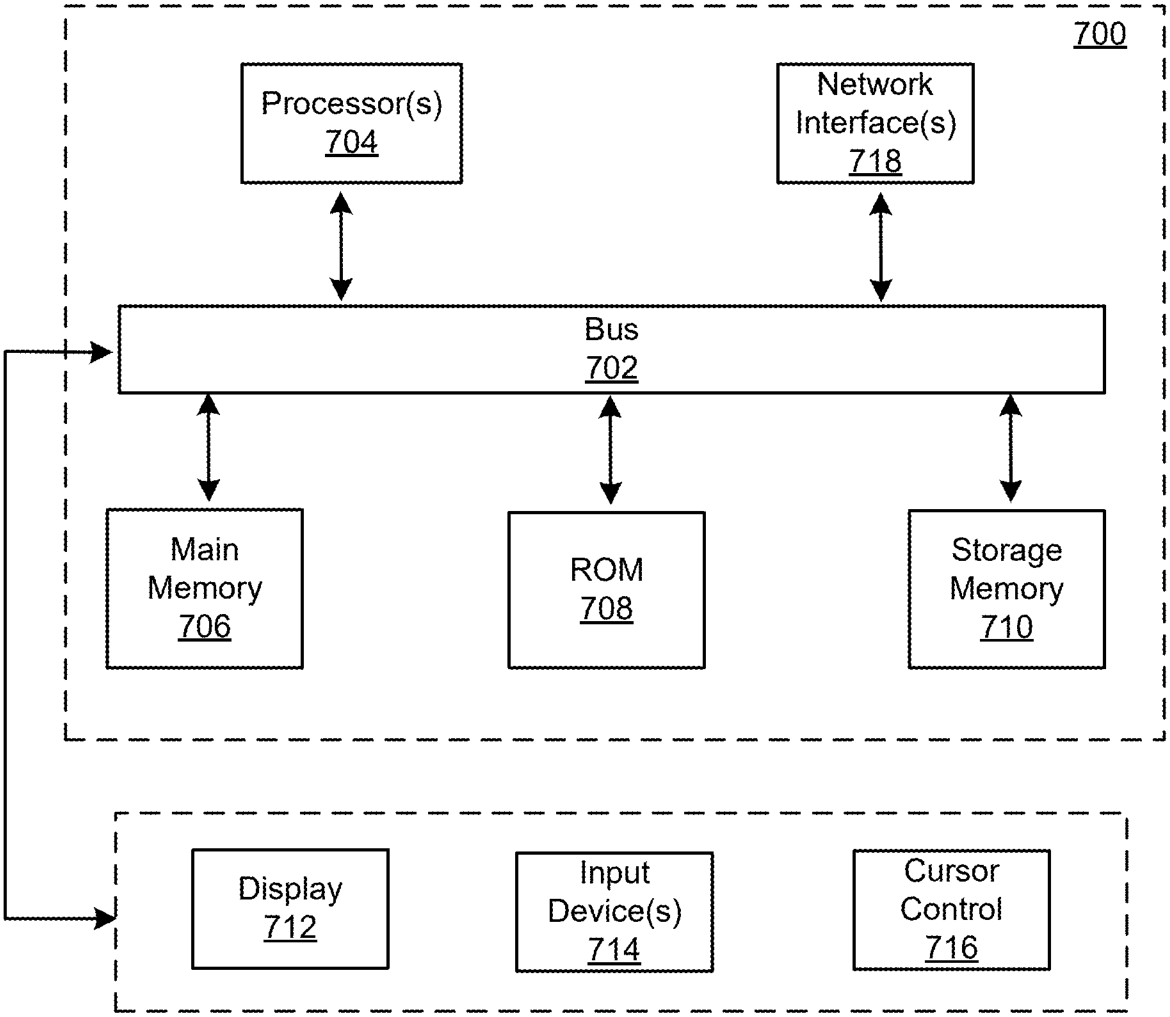
FIG. 7 depicts a block diagram of an example computer system in which various of the examples described herein may be implemented.

FIG. 7 depicts a block diagram of an example computer system 700 in which various of the examples described herein may be implemented. For example, AP 200 of FIGS. 2A-2B, AP 300 of FIG. 3, AP 400 of FIG. 4, and central entity 500 of FIG. 5 may be implemented using computer system 700. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some examples, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical indicators that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical indicators that carry digital data streams. The indicators through the various networks and the indicators on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point (AP) comprising:

one or more processors; and memory coupled to the one or more processors, the memory storing instructions executable by the one or more processors to cause the AP to:

receive an Automatic Frequency Coordination (AFC) response from an AFC vendor, the AFC response indicating one or more allowable channels and a maximum allowable power level for broadcasting wireless communications over a frequency band in a Standard Power mode, wherein the frequency band comprises the 6 GHz frequency band, and wherein the AFC response further indicates information related to protected geographical regions where broadcasting the wireless communications over the 6 GHz frequency band in the Standard Power mode is not permitted;

determine, based on the information related to the protected geographical regions, a safe zone geographical region where broadcasting the wireless communications over the 6 GHz frequency band in the Standard Power mode is permitted; and send, to at least one of a second AP and a central entity that manages APs in a Wireless Local Area Network (WLAN) deployment that includes the AP, a collaborative AFC response packet indicating the one or more allowable channels and the maximum allowable power level for broadcasting the wireless communications over the frequency band in the Standard Power mode, wherein the collaborative AFC response packet further indicates information related to the determined safe zone geographical region.

2. The AP of claim 1, wherein the information related to the determined safe zone geographical region comprises a two-dimensional (2-D) radius around the AP.

3. The AP of claim 1, wherein the AP sends the collaborative AFC response packet over a lower frequency band than the 6 GHz frequency band.

4. The AP of claim 1, wherein:

the memory comprises further instructions executable by the one or more processors to cause the AP to send, to the AFC vendor, an AFC query indicating global positioning system (GPS) coordinates of the AP; and the AFC response from the AFC vendor is responsive to the AFC query.

5. The AP of claim 4, wherein the memory comprises further instructions executable by the one or more processors to cause the AP to:

prior to receiving the AFC response from the AFC vendor, scan a lower frequency band than the 6 GHz frequency band for a collaborative AFC response packet sent by at least one of another AP and the central entity that manages APs in the WLAN deployment that includes the AP.

6. The AP of claim 5, wherein the memory comprises further instructions executable by the one or more processors to cause the AP to:

responsive to receiving the AFC response from the AFC vendor, enable 6 GHz wireless communication.

7. The AP of claim 1, wherein the memory comprises further instructions executable by the one or more processors to cause the AP to:

responsive to receiving the AFC response from the AFC vendor, override any previously received AFC response from the AFC vendor or previously received collaborative AFC response packet from at least one of another AP and the central entity that manages APs in the WLAN deployment that includes the AP.

8. An access point (AP) comprising:

one or more processors; and memory coupled to the one or more processors, the memory storing instructions executable by the one or more processors to cause the AP to:

receive a collaborative AFC response packet from at least one of a second AP and a central entity that manages APs in a Wireless Local Area Network (WLAN) deployment that includes the AP, wherein the collaborative AFC response packet indicates one or more allowable channels and a maximum allowable power level for broadcasting wireless communications over a 6 GHz frequency band in a Standard Power mode, and wherein the collaborative AFC response packet further indicates information related to a safe zone geographical region where broadcasting the wireless communications over the 6 GHz frequency band in the Standard Power mode is permitted;

determine that the AP is within the safe zone geographical region; and responsive to receiving the collaborative AFC response packet, enable 6 GHz wireless communication and broadcast wireless communications over the 6 GHz frequency band in the Standard Power mode.

9. The AP of claim 8, wherein:

the information related to the safe zone geographical region comprises a two-dimensional (2-D) radius around the second AP; and determining that the AP is within the safe zone geographical region comprises determining a distance between the AP and the second AP is less than the 2-D radius around the second AP.

10. The AP of claim 8, wherein:

the memory comprises further instructions executable by the one or more processors to cause the AP to scan a lower frequency band than the 6 GHz frequency band for the collaborative AFC response packet; and receiving the collaborative AFC response packet is responsive to the scanning.

11. The AP of claim 10, wherein:

the memory comprises further instructions executable by the one or more processors to cause the AP to attempt to self-locate with global positioning system (GPS) coordinates; and scanning the lower frequency band for the non-AFC vendor AFC response is responsive to a failed attempt by the AP to self-locate with GPS coordinates.

12. The AP of claim 10, wherein:

the memory comprises further instructions executable by the one or more processors to cause the AP to determine whether the AP has an old AFC response from an AFC vendor; and scanning the lower frequency band for the collaborative AFC response packet is responsive to determining the AP does not have an old AFC response from the AFC vendor.

13. The AP of claim 12, wherein:

the memory comprises further instructions executable by the one or more processors to cause the AP to send an AFC query to the AFC vendor; and determining whether the AP has an old AFC response from the AFC vendor is responsive to waiting for a new AFC response from the AFC vendor.

14. The AP of claim 8, wherein the memory comprises further instructions executable by the one or more processors to cause the AP to override any previously received AFC response from an AFC vendor or previously received collaborative AFC response packet from at least one of another AP and the central entity that manages APs in the WLAN deployment that includes the AP.

15. A method comprising:

receiving, from a first access point (AP) in a Wireless Local Area Network (WLAN) deployment, a collaborative AFC response packet indicating one or more allowable channels and a maximum allowable power level for broadcasting wireless communications over a 6 GHz frequency band in a Standard Power mode, wherein the collaborative AFC response packet further indicates information related to protected geographical regions where broadcasting the wireless communications over the 6 GHz frequency band in the Standard Power mode is not permitted;

determining, based on the information related to the protected geographical regions and a geographical location of the first AP, a safe zone geographical region within the WLAN deployment where broadcasting the wireless communications over the 6 GHz frequency band in the Standard Power mode is permitted; and sending, to one or more other APs in the WLAN deployment, a central entity-generated AFC response packet indicating the one or more allowable channels and the maximum allowable power level for broadcasting the wireless communications over the 6 GHz frequency band in the Standard Power mode, wherein the central-entity generated AFC response packet indicates information related to the determined safe zone geographical region.

16. The method of claim 15, wherein the information related to the determined safe zone geographical region identifies the first AP and indicates a two-dimensional (2-D) radius around the first AP where broadcasting the wireless communications over the 6 GHz frequency band in the Standard Power mode is permitted.

* * * * *